June 18, 1957  F. S. SCHILER  2,796,264
KEEPER KEY – UNIVERSAL TYPE
Filed March 4, 1954
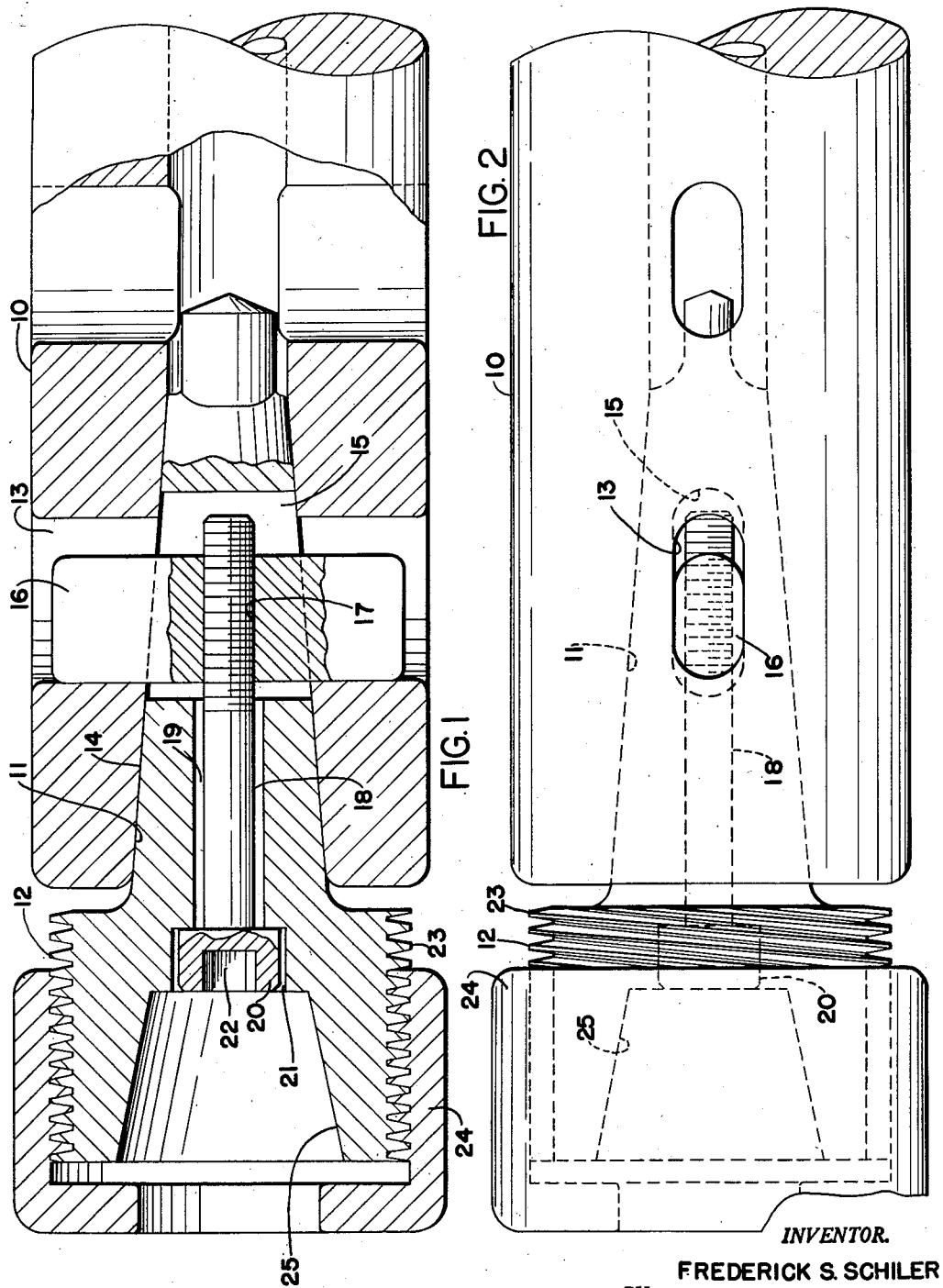
INVENTOR.
FREDERICK S. SCHILER
BY *Oldham & Oldham*
ATTORNEYS

2,796,264

KEEPER KEY—UNIVERSAL TYPE

Frederick S. Schiler, Cuyahoga Falls, Ohio, assignor to The Portage Machine Company, Summit County, Ohio, a corporation of Ohio Application March 4, 1954, Serial No. 414,162

3 Claims. (Cl. 279—97)

This invention relates to keepers for holding tools in the spindles of machine tools and is particularly useful in permanently holding chucks, boring bars or cutters in the tapered holes of the spindles of milling machines, boring machines, drilling machines, lathes and other machine tools against movement axially of the spindle during machining operations.

In the machine tool industry it is customary to provide the spindles of metal working machines with tapered sockets for receiving the tapered shanks of tools and to provide drift slots intersecting the axis of the spindle for inserting a tapered drift for use in removing the tools.

Although the tapered sockets and the tapered shanks of the tools are usually machined to great accuracy, some slight difference in taper may exist and cause the tool to work out of the socket especially when the tool encounters some resistant force in a direction axial of the spindle.

Any attempt to anchor the tool by means engaging a drift slot in the spindle has heretofore been difficult especially when a tool is to be transferred from one machine tool to another as the manufacturers of machine tools have not provided uniform spacing of the drift slot from the end of the spindle and the tapered sockets have not been of uniform diameter at the position of the drift slot.

It is an object of the present invention to provide an anchoring means or keeper which may be used on machine tools having slots non-uniformly located relative to the tapered socket.

Other objects are to provide a keeper which will securely anchor the tool against withdrawal from the socket, to provide a keeper that is simple in construction and one that may be quickly placed and removed.

These and other objects will appear from the following description and the accompanying drawings.

Of the drawings.

Fig. 1 is a side view of a machine tool spindle, a removable tool, and the keeper constructed in accordance with the invention, parts being broken away and parts shown in section;

Fig. 2 is a plan view thereof.

Referring to the drawings, the numeral 10 designates a rotatable spindle of a machine tool having a concentric axially tapered socket 11 formed therein for receiving a tool holder 12. The spindle has a drift slot 13 extending therethrough and intersecting the tapered socket.

The tool holder 12 is provided with a tapered shank 14 which extends beyond the drift slot 13 and has a cross slot 15 therethrough longer in a direction axial of its shank than the drift slot of the spindle. For securing the tool holder 12 to the spindle, a keeper 16 in the form of a bar of length less than the diameter of the spindle and of less width and thickness than the drift slot has a threaded opening 17 through it at its center for engaging a threaded screw 18. The screw 18 is preferably a socket headed cap screw and extends through an axial bore 19 of the tool holder with its head 20 seated in a counterbore 21 of the tool holder accessible from the end of the spindle where its socket 22 of hexagonal cross-section may be engaged by a wrench. The arrangement is such that the screw may be rotated to draw the keeper 16 against the near end of the drift slot 13.

The tool holder 12 is shown as a collet socket 25 and a threaded body 23 for engaging a draw cap 24. While the invention is illustrated as employed to hold such a tool holder in place, it will be apparent that other tool holders and tools may be held in place by use of the invention in the same manner.

In mounting the tool holder in the spindle, the taper shank 14 of the tool holder is entered in the tapered socket with its cross slot aligned with the drift slot of the spindle. The keeper 16 is then entered in the drift slot, the screw 18 entered in the bore 19 and the screw is rotated to engage it in the threaded opening of the keeper. Thereafter the screw may be tightened to secure the tool holder in place.

While one complete embodiment of the invention has been disclosed herein, it will be appreciated that modification of this particular embodiment of the invention may be resorted to without departing from the scope of the invention as defined in the appended claims.

I claim:

1. In combination, a rotatable machine tool spindle having a tapered tool socket and a drift slot extending cross-wise of the spindle and intersecting said socket, a tool member having a tapered shank received in said socket, said tool member having an axial bore and a cross slot intersecting such bore and being longer in an axial direction than said drift slot, and means anchoring said tool member in said spindle and comprising a removable key member positioned in the slots of said spindle and tool member and having a threaded cross opening extending therethrough, said key member being shorter in axial length than said drift slot but being retained therein against movement transversely of said spindle, and a screw extending through the axial bore of said tool member and engaged with the threaded cross opening of said key to secure such key in said drift slot.

2. In combination, a rotatable machine tool spindle having a tapered tool socket and a drift slot extending cross-wise of the spindle and intersecting said socket, a tool member having a tapered shank received in said socket, said tool member having an axial bore and a cross slot intersecting such bore, and means anchoring said tool member in said spindle and comprising a removable key member extending through the slot of said spindle and tool member and having a threaded cross opening extending therethrough, said key member being shorter in an axial direction of the tool spindle than said drift slot and said cross slot, and a screw extending through the axial bore of said tool member and engaged with the threaded cross opening of said key to secure said tool member to said tool spindle.

3. In combination, a rotatable machine tool spindle having a tapered tool socket and a drift slot extending cross-wise of the spindle and intersecting said socket, a tool member having a tapered shank received in said socket, said tool member having an axial bore and a cross slot intersecting such bore and being longer in an axial direction than said drift slot, and means anchoring said tool member in said spindle and comprising a removable key member positioned in the slots of said spindle and tool member and having a threaded cross opening extending therethrough, said key member being shorter in axial length than said drift slot, and a screw extending through the axial bore of said tool member and engaged between said tool member and the threaded cross opening of said key to secure such key in said drift slot and to draw said tool member tightly into said tool socket.

References Cited in the file of this patent

UNITED STATES PATENTS

| | | |
|---|---|---|
| 555,656 | Muller | Mar. 3, 1896 |
| 973,144 | Staples | Oct. 18, 1910 |

FOREIGN PATENTS

| | | |
|---|---|---|
| 353,394 | Germany | of 1922 |
| 125,616 | Switzerland | of 1928 |